United States Patent

Mitlitsky et al.

[19]

[11] Patent Number: 6,017,600
[45] Date of Patent: Jan. 25, 2000

[54] METHOD FOR FORMING A BLADDER FOR FLUID STORAGE VESSELS

[75] Inventors: Fred Mitlitsky; Blake Myers, both of Livermore; Frank Magnotta, Lafayette, all of Calif.

[73] Assignee: The Regents of the University of California, Oakland, Calif.

[21] Appl. No.: 09/093,643

[22] Filed: Jun. 9, 1998

Related U.S. Application Data

[62] Division of application No. 08/657,248, Jun. 3, 1996, Pat. No. 5,798,156.

[51] Int. Cl.⁷ .................................................. B29D 22/00
[52] U.S. Cl. ................ 428/35.9; 428/35.2; 428/35.3; 428/35.8; 428/36.2; 428/36.9; 428/36.91; 138/30; 138/37; 206/0.6
[58] Field of Search ................... 428/35.2, 35.3, 428/35.8, 35.9, 36.2, 36.9, 36.91; 138/30, 37; 206/0.6

[56] References Cited

U.S. PATENT DOCUMENTS

| | | | |
|---|---|---|---|
| 4,377,547 | 3/1983 | Hervig | 264/262 |
| 4,534,751 | 8/1985 | Fortuna et al. | 493/108 |
| 4,966,207 | 10/1990 | Howard et al. | 141/98 |
| 5,405,472 | 4/1995 | Leone | 156/218 |

*Primary Examiner*—Helen L. Pezzuto
*Attorney, Agent, or Firm*—L. E. Carnahan

[57] ABSTRACT

A lightweight, low permeability liner for graphite epoxy composite compressed gas storage vessels. The liner is composed of polymers that may or may not be coated with a thin layer of a low permeability material, such as silver, gold, or aluminum, deposited on a thin polymeric layer or substrate which is formed into a closed bladder using torispherical or near torispherical end caps, with or without bosses therein, about which a high strength to weight material, such as graphite epoxy composite shell, is formed to withstand the storage pressure forces. The polymeric substrate may be laminated on one or both sides with additional layers of polymeric film. The liner may be formed to a desired configuration using a dissolvable mandrel or by inflation techniques and the edges of the film seamed by heat sealing. The liner may be utilized in most any type of gas storage system, and is particularly applicable for hydrogen, gas mixtures, and oxygen used for vehicles, fuel cells or regenerative fuel cell applications, high altitude solar powered aircraft, hybrid energy storage/propulsion systems, and lunar/Mars space applications, and other applications requiring high cycle life.

26 Claims, 9 Drawing Sheets

METHOD FOR FORMING A BLADDER FOR FLUID STORAGE VESSELS

This is a Division of application Ser. No. 08/657,248 filed Jun. 3, 1996 now U.S. Pat. No. 5,798,156.

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to pressure vessels, particularly to vessels for gas/liquid storage, and more particularly to a lightweight bladder liner which may have high cycle life characteristics for such vessels and to a process for fabrication of same.

Pressure vessels have long been utilized in various applications, particularly for the storage of compressed gas. With the advent of space exploration and the development of ultra-light aircraft, lightweight gas storage vessels have become very important since a significant portion of the weight is in the cylinders used to store the fuel or other gaseous materials. For example, in solar cell/fuel cell powered aircraft, gases generated in an electrolyzer powered by solar cells in daylight are stored and then utilized to provide power for flight at night by combining in a fuel cell. Such a system is described in UCRL-JC-113485, "Regenerative Fuel Cells for High Altitude Long Endurance Solar Powered Aircraft", F. Mitlitsky et al., August 1993. The weight of the gas storage containers is thus a major concern. Similarly, in the case for road vehicles using gaseous fuels and oxidizers, such as hydrogen, oxygen, natural gas, other hydrocarbon gases, and various hydrogen/hydrocarbon gas mixtures, or in other compressed gas storage applications, gas storage vessel weight is a problem. In addition, recent efforts to use compressed gas storage vessels for rechargeable fuel cell powered solar aircraft, road vehicles, lunar/Mars rovers, zero emission vehicles, etc. have illustrated a need for lightweight pressure vessels. Such is discussed in UCRL-JC-117130, "Unitized Regenerative Fuel Cells for Solar Rechargeable Aircraft and Zero Emission Vehicles", F. Mitlitsky et al., Nov. 28, 1994.

The above-mentioned need is satisfied by the present invention which comprises a lightweight bladder lined pressure vessel, that can be utilized for compressed gas storage in applications where vessel weight is limited. The bladder lining of the present invention, compared to the conventional thin wall aluminum vessel barriers or liners and the more recently utilized thick-walled plastic barriers or liners, provides exceptionally high performance factors in weight sensitive applications. The lightweight pressure vessel of the present invention is a polymer lined or metalized polymer lined high strength to weight ratio material, such as graphite epoxy composite, compressed gas storage cylinder, wherein the liner may include a very thin layer of low permeability metal deposited onto a polymeric layer, which is then formed into a cylinder, for example, and provided with end caps.

SUMMARY OF THE INVENTION

It is an object of the present invention to provide a lightweight bladder for pressure vessels.

A further object of the invention is to provide a lightweight bladder lined graphite epoxy composite compressed gas storage vessel.

A further object of the invention is to provide a metalized polymer liner for compressed gas storage vessels.

Another object of the invention is to provide a process for fabricating a lightweight metalized polymer bladder for use in pressure vessels.

Another object of the invention is to provide a process for producing a graphite epoxy composite compressed gas storage vessel which includes a laminated metalized polymer bladder.

Another object of the invention is to provide a laminated metalized polymer bladder for use in storage of gaseous materials.

Other objects and advantages of the present invention will become apparent from the following description and accompanying drawings. The invention involves a lightweight, low permeability liner for graphite epoxy composite compressed gas storage vessels. The liner is composed of a thin layer of a low permeability material, such as a polymer or a material such as silver, gold, or aluminum on a thin polymeric sheet or substrate, which may then be laminated on at least one side by a polymeric layer, and then formed into a closed bladder or joined with polymeric ends. The thus formed bladder is enclosed in a graphite epoxy composite shell. The thin polymeric sheet or substrate may be composed of 0.2–10 mil thick polyethylene terephthalate (PET), with the deposited metal having a thickness of 10–1000 nm, and the lamination layer or layers being 0.2–10 mil thick low density polyethylene (LDPE) film, or a LDPE copolymer composed of ~95% by weight LDPE and ~5% by weight ethylene vinyl acetate (EVA), or a fluoroterpolymeric material such as trifluoroethylene-hexafluoropropylene-vinylidene difluoride (THV), with weight factors of ~60% T, ~20% H, and about 20% V. The bladder is fabricated by forming a cylindrical member from the metalized, laminated polymeric layer and forming torispherical end caps therefor from polymeric or fluoropolymeric metalized laminated material which may include a boss in one or both end caps for connection to a gas supply. The end caps and thus formed bladder is then wrapped or encased in a high strength to weight material, such as graphite epoxy composite material, to provide the capability to withstand storage pressure forces.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The present invention relates to lightweight bladder lined pressure vessels, particularly for compressed gas storage. The performance factor (F) for compressed gas storage vessels relates the storage pressure at burst (P) to the vessel weight (W) and internal volume (V) by the equation:

$$F = P \times V / W$$

Composite vessels as a class have a higher performance factor than metal vessels. Since composite vessels are permeable to many gases, some type of barrier must be included to reduce the permeation rate to acceptable low values. Thin wall aluminum has generally been used as the barrier and a relatively new development is the use of a thick-walled plastic barrier. The present invention involves a thin polymer that may or may not be metalized using low defect density, thin (10–1000 nm) film coatings of materials or metals, such as silver, gold, or aluminum (see Table I) on a polymeric substrate material, such as ~1 mil thick polyethylene terephthalate (PET), laminated with polymeric materials such as ~1–2 mil thick polyethylene films; i.e. low density polyethylene (LDPE) or LDPE copolymer of ~5% by weight ethylene vinyl acetate (EVA) and ~95% by weight low density polyethylene (LDPE), or a fluoropolymeric material such as THV, formed into a closed bladder. The bladder, for example, may be of a cylindrical or conical configuration closed at each end with a torispherical cap which may include a boss for connection to a point of use. Table I is from P. C. Souers, Hydrogen Properties for Fusion Energy (1986), and sets forth hydrogen permeabilities for various materials wherein permeability (K)=Ko exp ($-\theta_K/T$).

The approximate performance factors typical for various forms of cylindrical pressure vessel construction are: graphite/bladder (this invention) ~2.0E6 in.; graphite/plastic ~1.4E6 in.; graphite/aluminum (with low cycle life) ~1.4E6 in.; graphite/aluminum ~1.0E6 in.; aramid/aluminum ~6.5E5 in.; and S-glass/aluminum ~4.5E5 in. The approximate performance factors typical for various metal-walled cylindrical pressure vessels which do not require a separate barrier are: titanium ~4.2E5 in.; aluminum ~2.5E5 in.; and steel ~1.5E5 in. In weight sensitive applications the >50% performance factor advantage of graphite composite pressure vessels over any other vessel construction is critical. Higher performance graphite/aluminum vessels exist (e.g. ~1.4E6 in.), but these generally have a poor cycle life.

The process for fabricating the metalized polymer barrier, which is composed of a liner or bladder, and thereafter encased in a high strength to weight materials, such as graphite epoxy shell to withstand the storage pressure forces, is broadly set forth as follows, utilizing conventional or commercial processing techniques and practices:

1. Deposit a low permeability layer, such as silver, gold, or aluminum (~10–1000 nm thick) onto a substrate (sheet) such as ~0.2–10 mil thick polyethylene terephthalate (PET) that has acceptably low density of pinholes and cracks and has sufficient area to cover the area of a desired bladder. Deposition may be done by a number of techniques, such as sputtering or evaporation, onto one or both sides of the substrate. Multiple substrates may be stacked in series if required. Some low permeability polymers may not require this deposition step.

2. Laminate the coated substrate(s) on one or both sides with layers of polymeric film, such as low density polyethylene (LDPE) or LDPE copolymer or a fluoroterpolymer (THV) that is ~0.2–10 mil thick. Some low permeability polymers, such as THV, may not require the lamination steps.

Figure 4A:
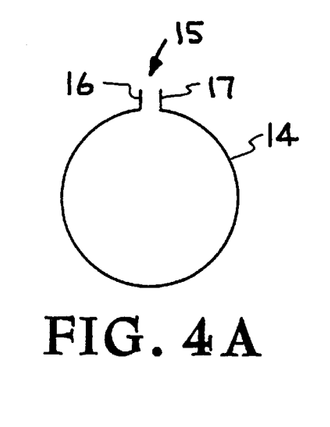
FIGS. 4A to 4D illustrate different seam types for forming the cylindrical bladder of FIG. 3 from a flat laminate, as shown in FIG. 2.
Figure 4B:
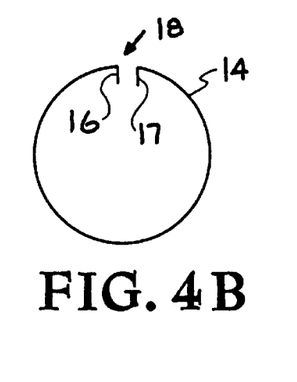
Figure 4C:
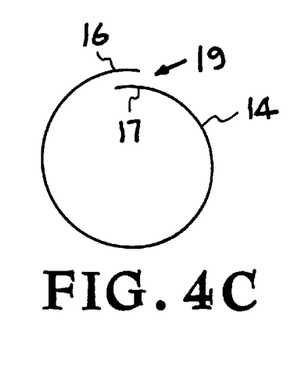
Figure 4D:
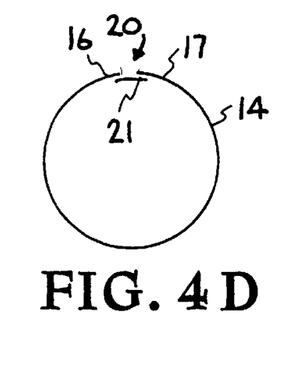
Figure 5:
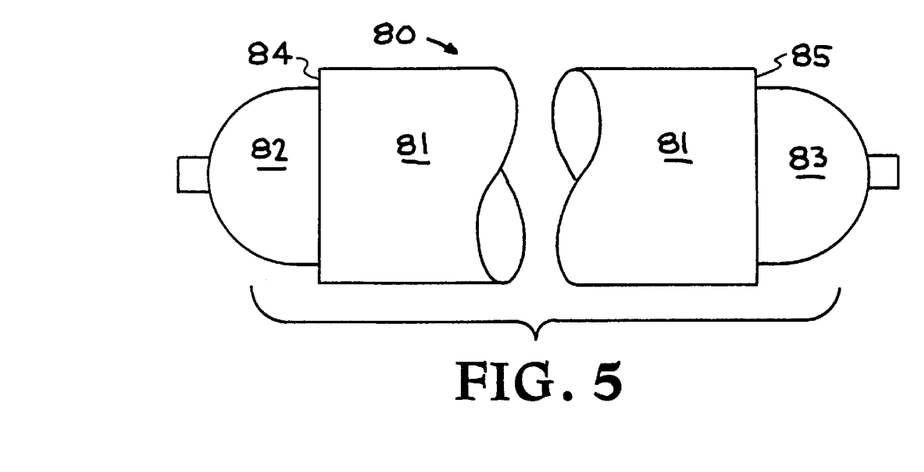
FIG. 5 illustrates a mandrel on which the cylindrical body section and torispherical or near torispherical end sections of the bladder may be formed.

3. Form the laminate into the shape of a tube and trim the laminate to the required size plus enough overlap area for a longitudinal seam, and then create that seam by heating. The seam may be a lap (shear), see FIG. 4C fin (peel), see FIG. 4A, inverted fin (inverted peel), see FIG. 4B, or double shear (butt), see FIG. 4D. The lap (FIG. 4C), or fin (FIG. 4A) seam being more easily constructed. A cylindrical soluble mandrel such as shown in FIG. 5 may be used as an aid to making the seam.

4. Form torispherical ends by a molding technique, such as rotomolding (rotational molding) or blow molding with a polymeric material, such as PET, LDPE, or THV, and include a cylindrical tail for mating with the tube.

5. Deposit a low defect density layer of low permeability material (see Table I), such as silver, gold, or aluminum (~10–1000 nm thick) onto the torispherical or near torispherical ends if required to obtain adequately low permeability.

6. Form matching inner and outer other-polymer ends (with an integral reinforcement of the cylindrical tail) if necessary for proper sealing onto the tube.

7. Laminate the other-polymer ends (described in step 6) with the torispherical ends (described in step 4) if required for heat sealing. This lamination may be assisted by the use of soluble torispherical mandrels as in FIG. 5.

8. Install bosses at the poles of the ends consisting of an open path for gas flow, an acceptably low permeability flange, with a sealing arrangement such as a low permeability polymer, a metal, or metalized o-ring, a matching separate disc, and a threaded nut for clamping the boss to the laminate. Alternatively, incorporate the bosses integrally in the torispherical ends by rotomolding or blow molding the PET, LDPE, or THV material to surround the bosses.

9. Heat seal the ends to the tube by one or more of the following techniques:
    a. Install the ends of the tube onto the cylindrical tail of a torispherical end and create a shear seam.
    b. Install the ends in a concave orientation with respect to the tube and create a fin seam (see FIG. 4A) by heat sealing and pull the ends through to a convex orientation (see FIG. 10).
    c. Construct a female vacuum chuck of the proper torispherical shape which extends to the equator of the end, then construct a female cylindrical vacuum chuck which includes a heating strip near one end, then install the tube end and the torisphere inside the respective vacuum chucks, then bring the two chucks together by inserting the cylindrical tail of the torisphere into the tube end and create a lap seam (see FIG. 4C).

d. Construct a soluble disc to match the diameter and length of the cylindrical tail of the torisphere, then install the end onto the disc, then insert that assembly into the tube end, create a lap seam, and dissolve the soluble disc.

e. Repeat the process(es) at the other end of the tube.

10. Quality assurance check the assembly as required.
11. Create a compressed gas storage vessel by encasing the bladder with a high strength-to-weight material, such as graphite epoxy composite material to the necessary thickness. This can be done by using a soluble mandrel (FIG. 5), or by inflating the bladder mechanically or pneumatically, then connecting spindles to the bosses at each end, then setting the assembly in bearings in a frame with means for rotating the assembly, followed by one or more of the following procedures:

a. Orient the frame such that the bladder axis is vertical and rotate the assembly, winding on the high strength-to-weight material, such as epoxy covered graphite tows by means of a filament winding machine; and/or b. Same procedure as in step a, except to orient the bladder axis in the horizontal plane.

Figure 12:
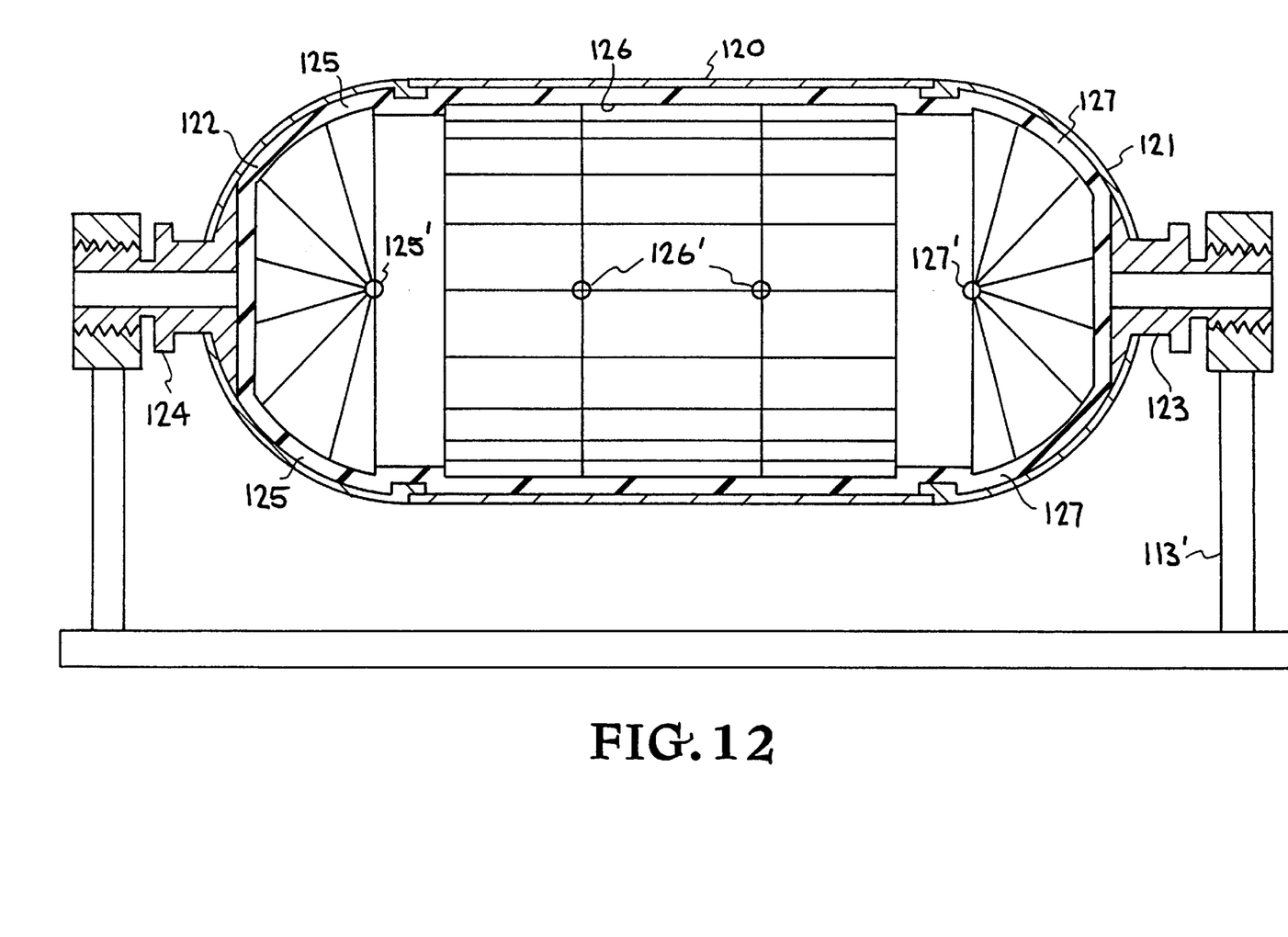
FIG. 12 is a view partially in cross-section of an erectible integral mandrel for the bladder to enable wrapping of the bladder.
Figure 13:
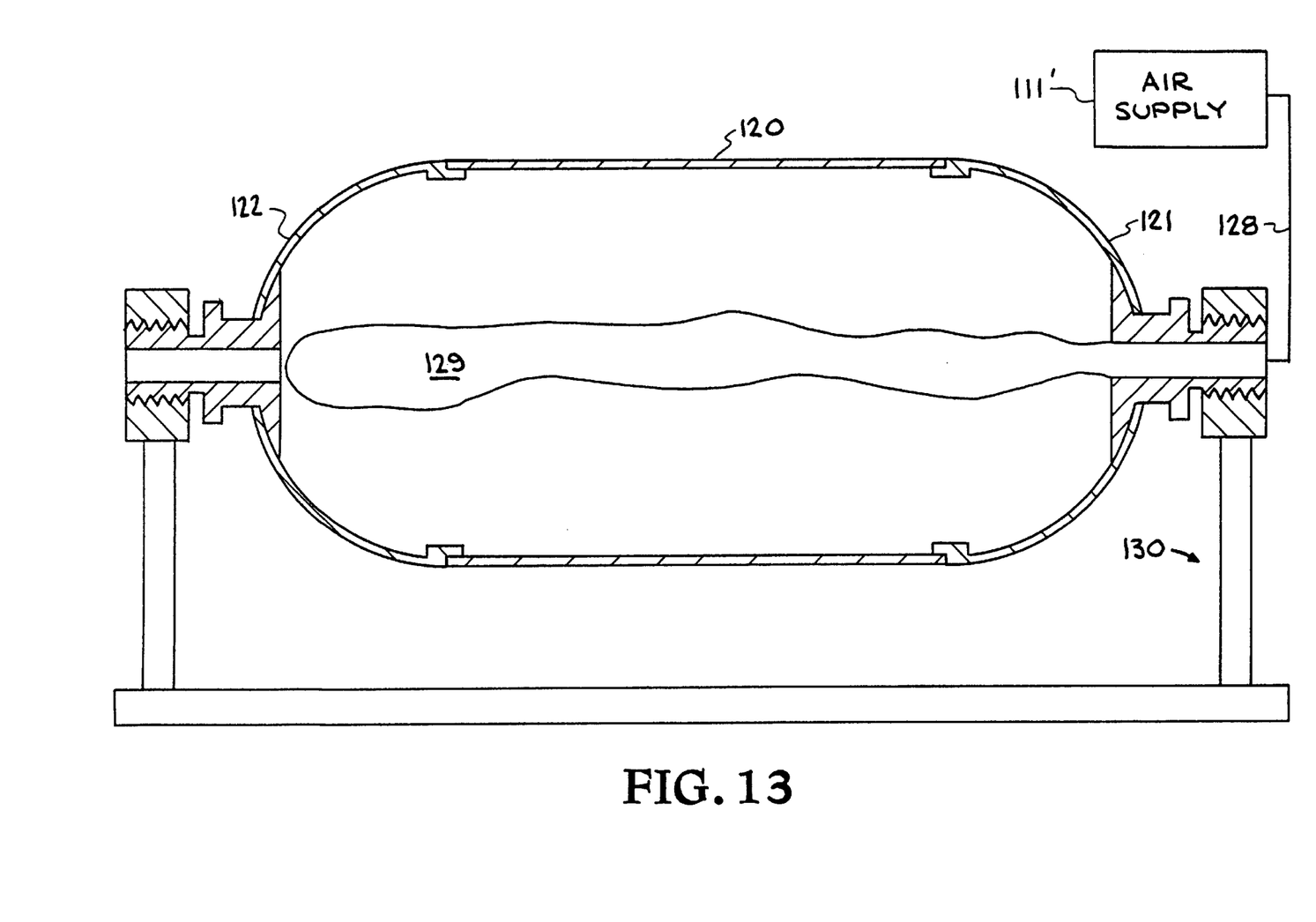
FIG. 13 is a view partially in cross-section of an inflatable collapsible and removable mandrel to enable wrapping of the bladder.

The bladder can be inflated by air (FIG. 11), a mechanical expandable/collapsible/removable liner (FIG. 12) or a pneumatic collapsible/removable liner (FIG. 13).

Figure 1:
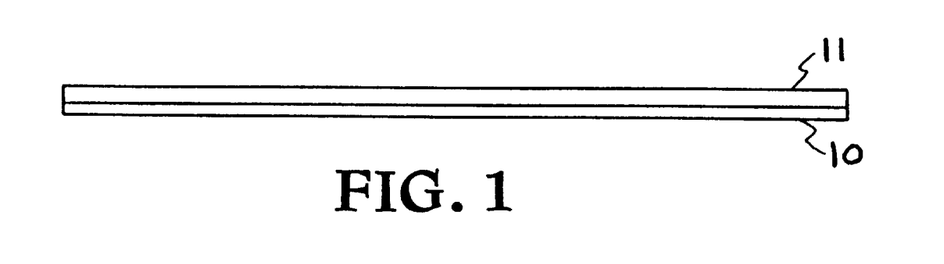
FIGS. 1–3 illustrate operational steps for forming a cylindrical section of the bladder.

The following is a detailed example of the bladder fabrication process and is set forth in conjunction with FIGS. 1–10:

1. Deposit, as shown in FIG. 1, a metal layer 10 on a substrate 11 by sputtering or evaporation, for example. The metal layer 10 has a thickness of ~10–1000 nm and may be composed of silver, gold or aluminum. The substrate 11 has a thickness of ~0.2–10 mil and may be composed of polyethylene terephthalate (PET). A metal layer 10 may be deposited on both sides of substrate 11.

Figure 2:
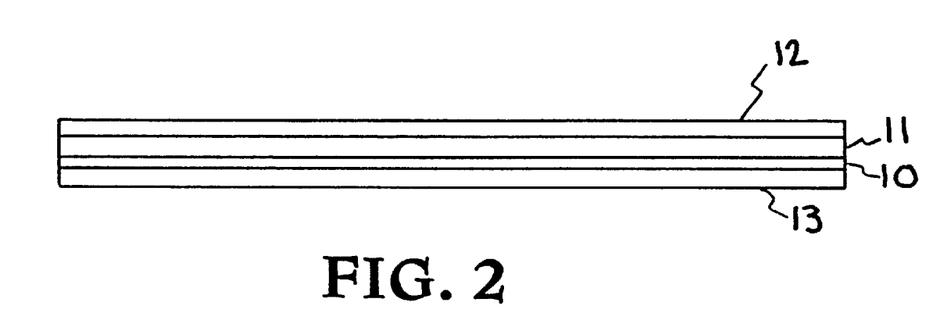

2. The metal coated substrate 10 is laminated on both sides with layers 12 and 13 of a polymeric film, as seen in FIG. 2. The laminate has a thickness of ~0.2–10 mil and may be composed of low density polyethylene (LDPE), an LDPE copolymer, or a fluoroterpolymer such as THV. The laminate may, if desired be located on only the PET side of the metal coated substrate 11. The lamination may be carried out by any of a number of standard commercial processes, such as of hot roll bonding with an adhesive layer, or by extrusion of the laminate onto one or both sides of the metal coated substrate.

Figure 3:
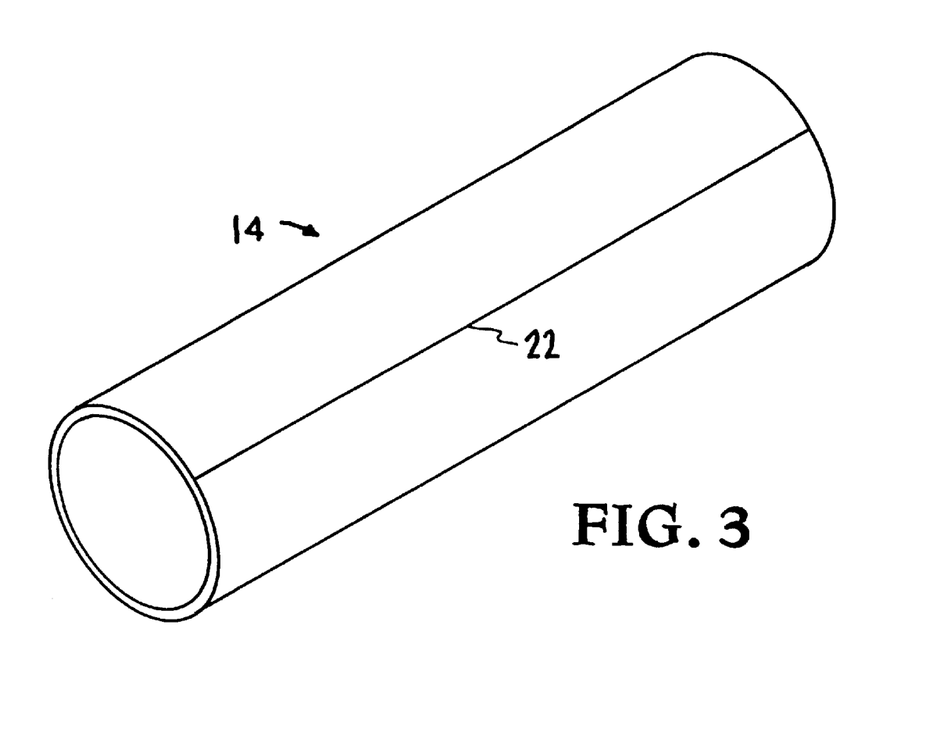

3. The thus laminated metal coated substrate indicated at 11' in FIGS. 2 and 3 is then trimmed to a desired size and rolled to form a tubular or cylindrically configured body or member 14 of a desired size, internal diameter of ~0.5 to ~500 inches, plus enough overlap area to form a seam 22 as seen in FIG. 3. The internal diameter needs to be small for applications such as portable computers and much larger for applications such as launch vehicles. The seam 22 may be of the four types illustrated in FIGS. 4A–4D. FIG. 4A illustrates a peel or fin seam indicated at 15 having the ends 16 and 17 of laminated substrate 11' (member 14) extending outwardly; FIG. 4B illustrates an inverted peel or inverted fin seam indicated at 18 having the ends 16 and 17 of laminated substrate 11' extending inwardly; FIG. 4C illustrates a shear or lap seam indicated at 19 having the ends 16 and 17 of laminated substrate 11' overlapping each other; and FIG. 4D illustrates a butt or double shear seam indicated at 20 having the ends 16 and 17 of laminated substrate 11' butting each other and a strip 21 of the laminated substrate positioned along the length of the member or tube 14 so as to seal with ends 16 and 17. The lap or shear seam 19 or the fin or peel seam 15 are preferred due to simplicity of construction.

4. A seam, indicated at 22 in FIG. 3, is then created by heating the ends 16 and 17 of the laminated substrate 11', using a temperature in the range of 60 to 200° C. For an LDPE laminated PET substrate, the ends 16 and 17 are heated to a temperature of 90° C.

Figure 6:
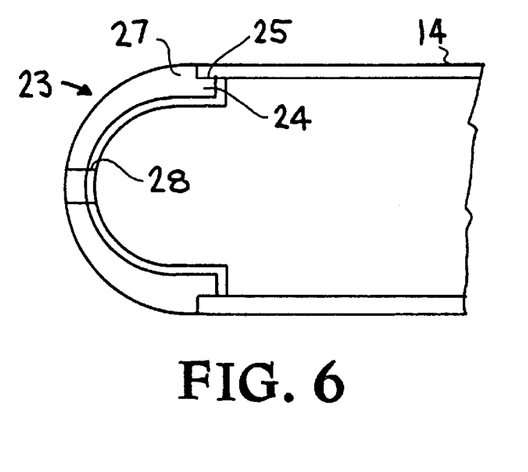
FIG. 6 illustrates in cross-section a portion of the cylindrical section and one torispherical end section formed on the mandrel of FIG. 5.

5. Form torispherical ends for the tubular or cylindrical member 14, such as the torispherical end 23 with opening 23', as shown in FIG. 6. The torispherical ends 23 are formed from a polymeric material, such as PET, LDPE or THV, having a thickness of 0.0002 to 0.250 inch, and include a cylindrical tail indicated at 24 in FIG. 6, which extends into the end of member 14 for mating with the internal surface 25 of tubular member 14. For example, where THV is used, a fraction of a mil is okay for permeation but may be thicker to bury boss, or the boss could be made of a similar polymer. By way of example, with the tubular member or body 14 having an internal or inner diameter of 12 inches and a thickness of ~0.2–10 mil., the torispherical ends 23 would have a thickness at the periphery, indicated at 27, thereof of ~0.0002–0.250 inch, with the tail 24 having a thickness of ~0.250 inch and length of ~1.0 inch.

6. If needed to obtain adequately low permeability, deposit a metal layer 28 on an inner surface of the torispherical ends 23 and the tails 24, as seen in FIG. 6. The metal layer 28 may have a thickness of ~10–1000 nm and may be composed, for example, of silver, gold, or aluminum.

7. As an alternative to step 5 above, form matching polymeric ends 29, from a sheet of polymeric material, with an integral reinforcement of the cylindrical tail area, indicated at 30 in FIG. 7, for proper sealing with the ends of the tubular or cylindrical member 14.

8. As another alternative to steps 5 and 7 above, laminate the polymeric ends 29 described above in step 7 and shown in FIG. 7, with the torispherical ends 23 described in step 5 above and shown in FIG. 6, if required for heat sealing.

9. Install bosses at the pole of at least one of the ends as shown in FIGS. 7, 8, and 9 to provide an open path for gas flow, the bosses of each of the Figures being described hereinafter.

Figure 7:
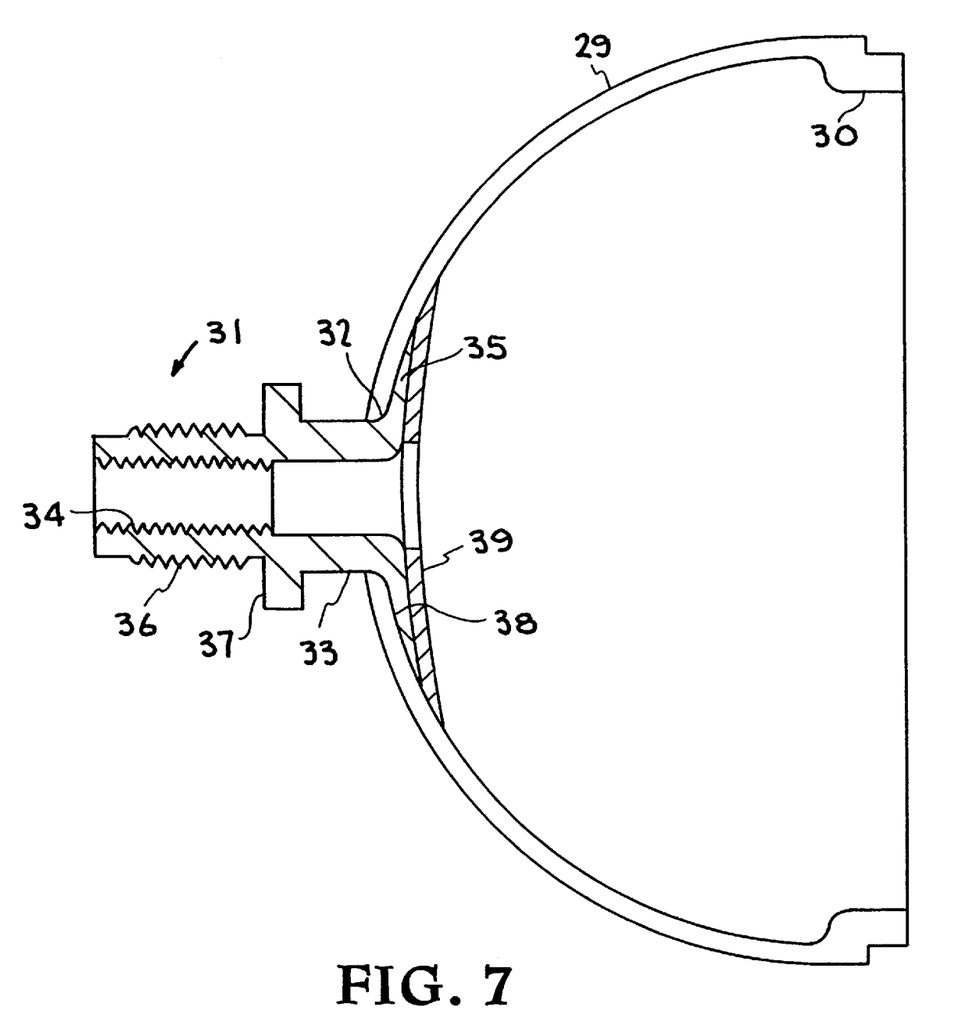
FIGS. 7, 8 and 9 illustrate embodiments of bosses installed at the pole of at least one of the torispherical or near torispherical end sections of the bladder.

In FIG. 7, a boss, generally indicated at 31, is positioned in a pole opening 32 of end member 29 and is constructed of a body 33 of low permeability polymeric material having a partially threaded opening 34, a flanged inner end section 35, a threaded outer end section 36, and an outwardly extending section 37 adjacent threaded section 36 forming a connection nut or stop. In this embodiment the flanged inner end section 35 is covered by a layer of polymeric material 39, and is then heat sealed between an inner surface 38 of polymeric end member 29 and the layer 39. The body 33 of the boss 31 may be constructed of an appropriate metal such as stainless steel or titanium, or a low permeability polymer, or a polymer-lined composite.

Figure 8:
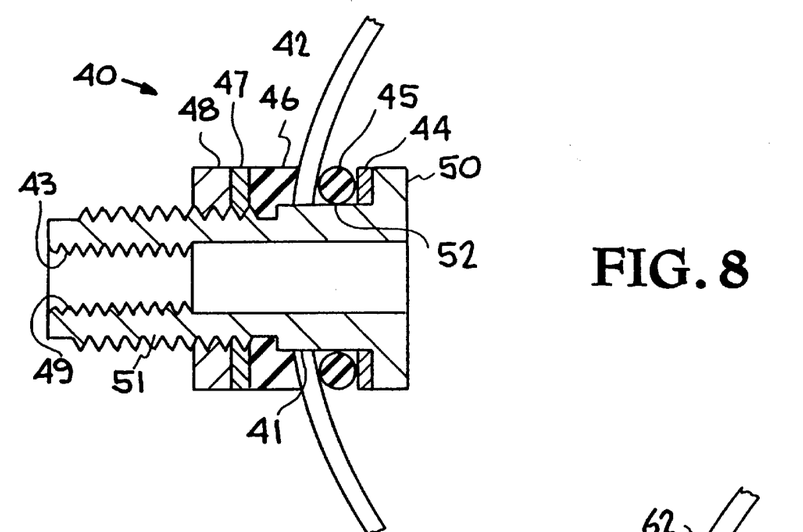

In FIG. 8, a boss, generally indicated at 40 is positioned in a pole opening 41 of end member 42 of the composition described above with respect to any of steps 5, 7, or 8, and comprises a body or member 43, a compressible member or seal 44, an o-ring 45, a ring seal 46, a compressible member or seal 47 and a threaded nut 48. Body or member 43 includes a partially threaded opening 49, an inner flange section 50, a threaded outer section 51, and a smooth outer section 52 adjacent flange section 50. The seal ring 46 may have a curved surface 53 to conform with the curvature of end 42. The body 43 and nut 48 may be constructed of metal or plastic and the body 43 is sealed in end 42 by o-ring 45 and ring seal 46, when nut 48 is tightened (turned toward flange 50). The o-ring 45 and/or ring seal 46 may be constructed of polymeric material or metalized material, and the compressible members or seals 44 and 47 may be constructed of a polymeric or metalized material.

Figures 9, 10:
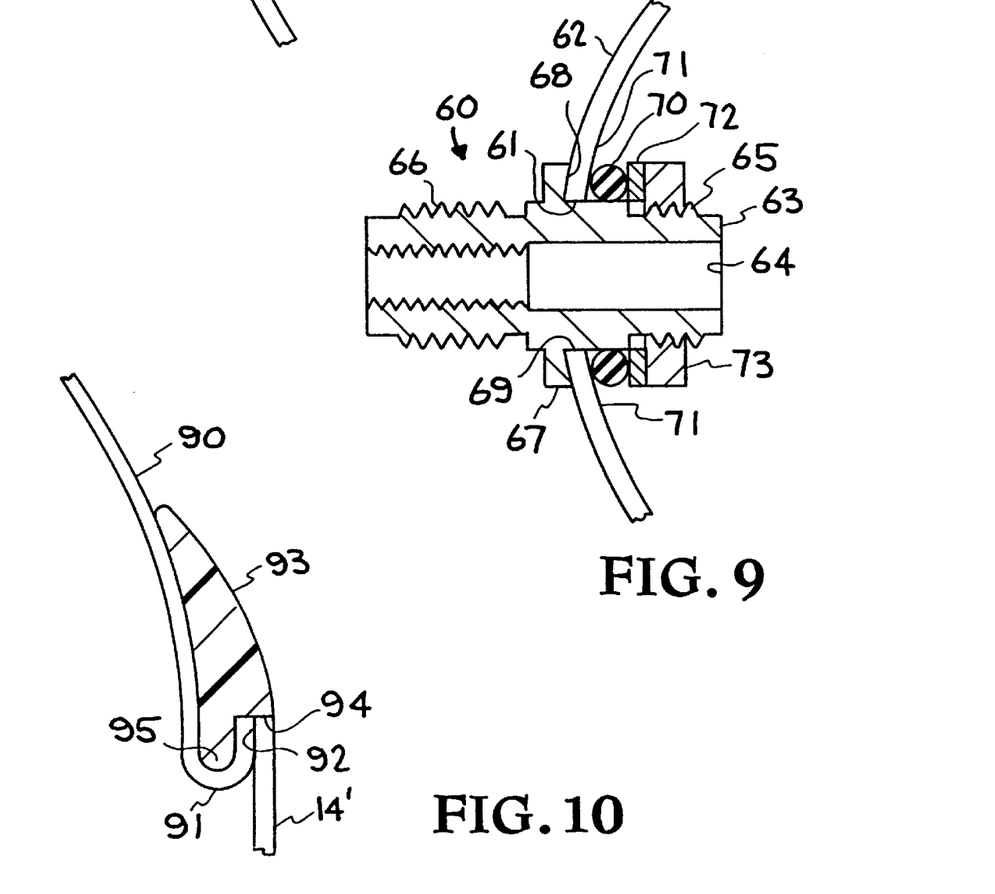
FIG. 10 illustrates another embodiment of a tail between the cylindrical body and end sections of the bladder.

In FIG. 9, a boss, generally indicated at 60, is positioned in a pole opening 61 of end member 62 of the construction described above with respect to steps 5, 7, or 8. Boss 60 comprises a body or member 63 having a partially threaded opening 64, outer threaded ends 65 and 66, a flanged section 67 having a curved surface 68, and a smooth outer surface 69. An o-ring 70 is retained in contact with an inner surface 71 of end member 62 via a compressible member or seal 72 and a nut 73 secured on threaded end 65 of member 63. When nut 73 is tightened (turned toward end member 62), the boss 60 is secured and sealed in pole opening 61 between the curved surface 68 of flange section 67 and o-ring 70. The threaded end 66 of member 63 is adapted to be connected to a point of use, not shown. The body or member 63 and nut 73 may be constructed of a polymeric material or a metal, the o-ring 70 may be polymeric or metalized material, and the compressible member or seal 72 may be composed of polymeric or metal material.

10. Heat seal the torispherical ends, shown in FIG. 6 and produced via step 5 above, or the polymeric ends, shown in FIG. 7 and produced via step 7 above, or the laminated polymeric ends/torispherical end produced via step 8 above, to the tube 14 shown in FIG. 2, for example, thereby producing a lightweight bladder. The heat sealing may be carried out by one or more of the following techniques:

a) Install the ends in a concave orientation with respect to the tube and create a fin type seam (FIG. 4A) between the ends and the tube ends by heat sealing, and pull the ends through to a convex orientation.

b) construct a segmented female vacuum chuck of the proper torispherical shape which extends to the equator of the end, then construct a segmented female cylindrical vacuum chuck which includes a heating strip near one end, then install the tube end and the torisphere end in the respective vacuum chucks, and then bring the two chucks together by inserting the cylindrical tail, such as 24 in FIG. 6, of the torisphere end 23 into the end of tube 14 and create a lap type seam (FIG. 4C).

c) Construct a soluble disc or mandrel, such as shown in FIG. 5, wherein the disc generally indicated at 80 comprises a body section 81 and curved end sections 82 and 83 of a smaller diameter than body section 81 to form intersecting steps 84 and 85, respectively. The disc 80 is constructed so that the body section 81 will match the inner diameter or surface 25 of the tubular member 14 (see FIG. 6) and of a length such that the interconnecting steps 84 and 85 match the length and diameter of the cylindrical tails 24 of the torisphere ends 23 (see FIG. 6), and the inner surfaces of ends 23 match the curved end sections 82 and 83 of the disc 80. End sections 82 and 83 include protruding sections 86 and 87 to form the opening 23' in end 23 of FIG. 6. Where a metal layer 28 is deposited on the inner surface of ends 23, the curved end sections 82 and 83 and steps 84 and 85 of disc 80 are configured to correspond to the thickness of the metal layer. Then insert the disc or mandrel 80 into the tubular member 14, and then install a torispherical end 23 on the end section 82 or 83 of the disc and create a lap seam (FIG. 4C) by heating. Then repeat the process for the other end of the tube 14. Then, using a solvent rinse, dissolve and remove the material of disc 80.

11. Quality assurance check the assembly as required.

12. Depending on the construction and configuration of the polymeric ends 42 and 62 of FIGS. 8 and 9, for example, a seal between the periphery or tail of the ends 42 and 62 and the ends of the associated tubular member 14, for example, can be formed as shown in FIG. 10. Here, the curved polymeric end 90 includes a curved tail 91 which contacts an inner surface 92 of a tubular member 14'. A polymeric member 93, constructed of the same or similar material as polymeric end 90, is positioned around the end 90 and abuts an end 94 of the tubular member 14'. Member 93 includes a protruding section 95 which extends into the curved tail 91 of polymeric end 90, thereby forming a smooth contour for subsequent encasing operations.

13. Create a compressed gas storage vessel by encasing the thus formed bladder, such as shown in FIGS. 6 and 7, for example, with graphite epoxy composite material to the necessary thickness. This can be done by inflating the bladder to a low pressure, then connecting spindles to the bosses at each end, then setting the assembly in bearings in a frame with means for rotating the assembly, followed by one or more of the following procedures:

I) Orient the frame such that the bladder axis is vertical and wind on the epoxy covered graphite tows by means of a filament winding machine; or II) Same procedure as in I above except to orient the bladder axis in the horizontal plane.

Figure 11:
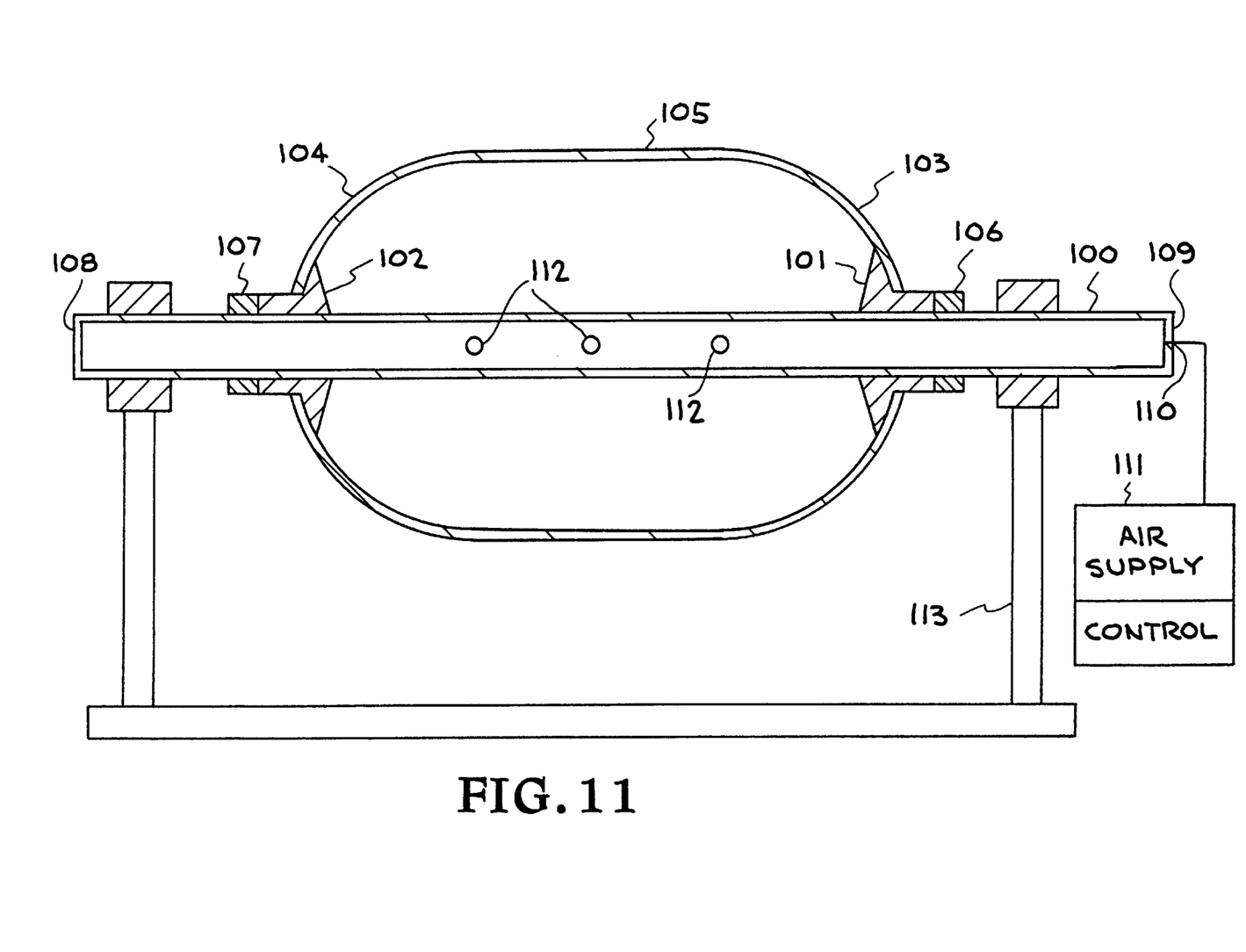
FIG. 11 illustrates partially in cross-section, a prior art apparatus for inflating members with air to enable wrapping same, and is shown adapted for inflation of the bladder of this invention.

FIG. 11 illustrates a prior art inflation apparatus adapted to inflate the bladder of the present invention to a low pressure to allow the bladder to be encased, such as by wrapping with a graphite epoxy composite material, as described above, or other encasing material. The known apparatus of FIG. 11 basically comprises a pipe or tube 100 which extends through bosses 101 and 102 located in the ends 103 and 104 of bladder 105. A pair of seals 106 and 107 are positioned adjacent to bosses 101 and 102. Pipe 100 is closed at end 108 and connected at end 109 via a small aperture 110 to an air supply/control mechanism generally indicated at 111. A portion of pipe 100 located within bladder 105 is provided with a plurality of apertures 112. A frame 113 supports the assembly during encasing operations.

In operation, air from supply/control mechanism 111 is directed through aperture 110, pipe 100 and apertures 112 into bladder 105 causing inflation thereof as shown in FIG. 11, which is maintained in the inflated condition during encasing of bladder 105 with the above-referenced graphite epoxy composite material. After encasing of the bladder is completed, the assembly with the air pressure maintained at the initial pressure is heated in a chamber as required to cure the epoxy material. Subsequently the air is released from pipe 100 and bleeds out of bladder 105 via apertures 112, whereafter the seals 106 and 107 and pipe 100 are removed.

FIGS. 12 and 13 utilize instead of air, an expandable member to inflate the thus formed bladder so as to enable encasing thereof with the graphite epoxy material or other encasing material. In FIG. 12, the expandable member is driven from the outside by expanding and locking linkages which drive conformal segments to create the required inner geometry for the subject vessel; while in FIG. 13 the expandable member is pneumatically driven and can be deflated and removed from within the bladder after the bladder has been encased.

As seen in FIG. 12, a bladder 120 having ends 121 and 122 containing bosses 123 and 124 is provided with expandable conformable members 125, 126, and 127, connected to linkage assemblies 125', 126', and 127' which when activated move the conformable members 125 to 127 outwardly against the interior surface of bladder 120 and the ends 121 and 122, creating a pressure or force on bladder 120 and ends 121 and 122 sufficient to enable encasement with a desired material. The linkage assemblies 125', 126', and 127' operate similar to a conventional umbrella for radially moving conformable members 125–127. A frame 113' supports the assembly during encasing operations. After the encasing and curing operations are completed, the linkage assemblies 125'–127' are retracted, withdrawing the conformable members 125–127 inwardly so that they can be removed through the openings in bosses 123 and 124. The arrangement is appropriate for relatively large sized openings in the bosses.

The FIG. 13 embodiment differs from that of FIG. 12 by utilizing a pneumatically expandable member instead of a mechanically expandable member. Components corresponding to those of FIG. 12 are given similar reference numerals. In operation air is directed from air supply 111' through tube 128 into expandable member 129 which inflates same and produces a pressure or force against bladder 120, thereby allowing encasement of the bladder as described above. Upon completion of the encasing and curing operations, air is exhausted from expandable member 129 which allows the expandable member to collapse after which it can be removed along with tube 128 via boss 123. During the encasing and curing operations the bladder 120 may be retained in a fixture, as indicated at 130 in FIG. 13.

Figure 14:
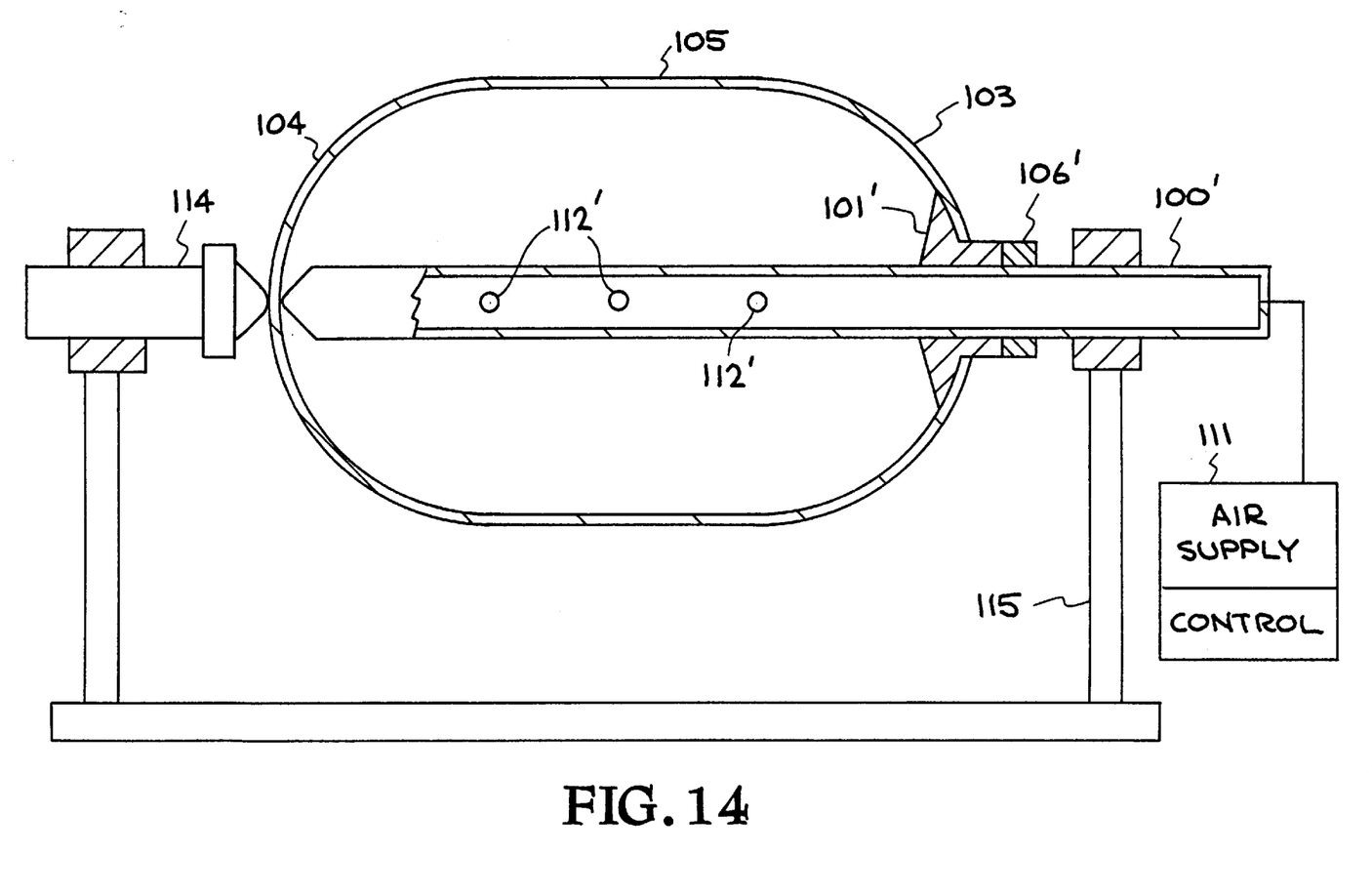
FIG. 14 is a partially cross-sectional view of a modification of the FIG. 11 prior art apparatus, wherein the air supply pipe does not extend through the bladder, for inflation of a bladder open only at one end.

FIG. 14 illustrates an embodiment similar to FIG. 11 except the bladder is only open at one end and the air supply pipe does not extend through the bladder as in FIG. 11. Corresponding reference numerals are given to similar components of FIG. 11. Also, in FIG. 14, the boss in the end of the bladder is constructed similar to that of FIGS. 7, 8, or 9. As seen an air supply pipe or tube 100' extends through a boss 101' in end 103 of bladder 105 to an opposite end 104 of the bladder, and is connected to an air supply/control 111. Pipe 100' is provided with a plurality of apertures 112' through which air passes to inflate bladder 105. A support member 114 is positioned adjacent to end 104 of bladder 105 and supported by a frame 115 during encasing operations. In operation, air is supplied via pipe 100' through apertures 112' for inflating bladder 105 and retaining same in inflated position during the encasing and curing operations, after which the air is exhausted via apertures 112' and pipe 100', and pipe 100' is removed from boss 101.

Figure 15:
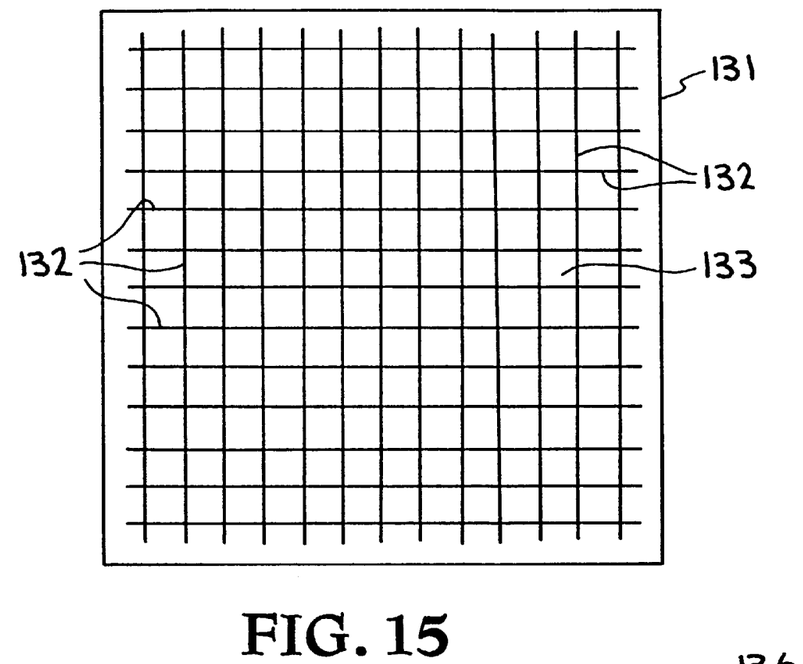
FIG. 15 illustrates a section of an open-web scrim which can be utilized to fabricate the bladder of this invention.

FIG. 15 illustrates a section of a laminated material which can be utilized to form the bladder. The material is composed of high strength threads which are cross-woven or interwoven to form a net or open-web cloth and either laminated with at least one film or layer of polymeric material to form a scrim which is flexible or coated with a non-hardened epoxy. The scrim is formed into a tube and the edges thereof sealed as described above with respect to FIG. 3. As shown in FIG. 15, the material 131 comprises interwoven threads 132 and laminated on both sides by a layer or film of polymeric material 133, such as LDPE, LDPE copolymer, and THV fluorpolymer. The polymeric material may be a laminate of these materials singly with the metalized PET, as shown in FIG. 2.

Figure 16:
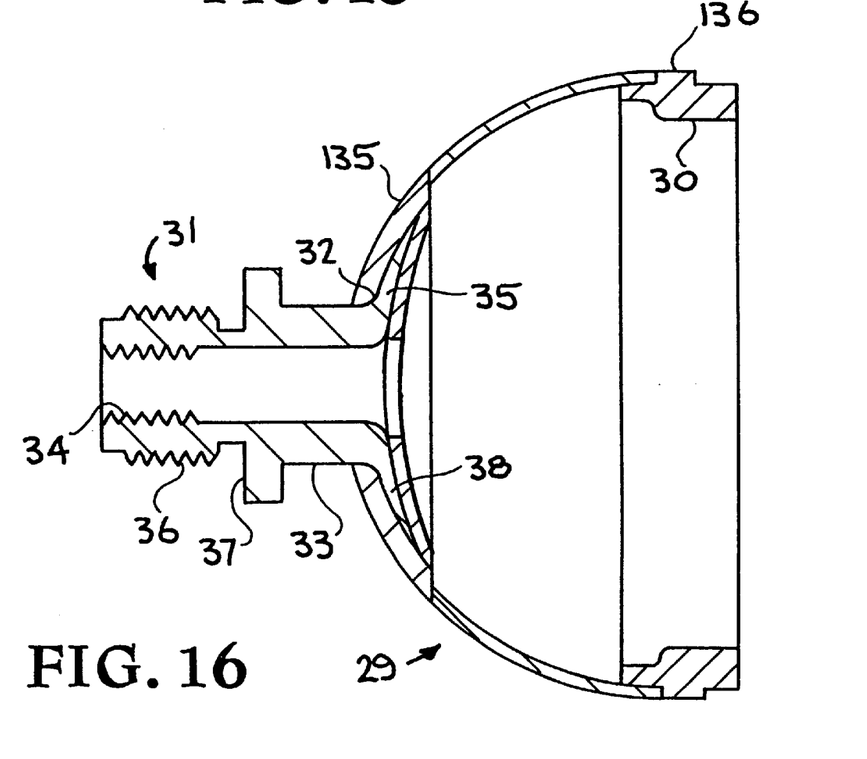
FIG. 16 illustrates a modification of the FIG. 7 torispherical end section for the bladder.

FIG. 16 illustrates an end member and boss similar to FIG. 7 except for the construction of the end piece. As shown in FIG. 16, end member generally indicated at 29 is composed of two sections 135 and 136, section 135 retaining a boss 31 with section 136 being provided with a cylindrical tail area 30, as in FIG. 7. The sections 135 and 136 of end piece 29 are interconnected by a layer of material 137 composed of the same material of which the bladder or cylindrical member 14 of FIG. 6 is composed, for example. Also, the end sections 135 and 136 can be interconnected by the interwoven material of FIG. 15.

It has thus been shown that the present invention provides a lightweight, low permeability liner or bladder for graphite epoxy composite compressed gas storage vessels, for example. The liner or bladder is formed of low permeability material on a polymeric substrate or of an interwoven polymeric material and has various applications, in various types of gaseous or fluid storage vessels or containers used in land based, underwater, and air or space vehicles, particularly in weight sensitive applications.

While specific embodiments, operational procedures, materials, etc. have been described and/or illustrated to exemplify and set forth the principles of the invention, such are not intended to be limiting. Modifications and changes may become apparent to those skilled in the art, and it is intended that the invention be limited only by the scope of the appended claims.

TABLE I

Permeabilities of Hydrogen "Impermeable" Materials Listed in Order of Descending Extrapolated Permeability at 300 K

| Material Permeated | Hydrogen | $K_0$ (mol/m · s · Pa$^{1/2}$ or mol/m · s · Pa) | $0_K$ (K) | Extrapolated K at 300 K and 1 Pa (mol/m · s) | Measured temp range (K) |
| --- | --- | --- | --- | --- | --- |
| Fe | $H_2$ | 4.1(−8) | 4200 | 3(−14) | 375–850 |
| 89 Fe-11 Ge | $H_2$ | 3.7(−8) | 5030 | 2(−15) | 570–1070 |
| Ni | $H_2$ | 4.0(−7) | 6600 | 1(−16) | 300–775 |
| Co($\alpha$) | $D_2$ | 3.8(−8) | 7750 | 2(−19) | 670–820 |
| Stainless, 304S | $H_2$ | 2.0(−6) | 8660 | 6(−19) | 370–570 |
| CO($\epsilon$) | $D_2$ | 6.3(−9) | 6850 | 7(−19) | 470–670 |

TABLE I-continued

Permeabilities of Hydrogen "Impermeable" Materials Listed in Order of Descending Extrapolated Permeability at 300 K

| Material Permeated | Hydrogen | $K_0$ (mol/m · s · Pa$^{1/2}$ or mol/m · s · Pa) | $\theta_K$ (K) | Extrapolated K at 300 K and 1 Pa (mol/m · s) | Measured temp range (K) |
|---|---|---|---|---|---|
| Ag | $H_2$ | 3.4(−8) | 7350 | 8(−19) | 730–980 |
| Cu | $H_2$ | 8.4(−7) | 9320 | 3(−20) | 470–700 |
| Silica glass | $H_2$ | 3.4(−17) · T | 3600 | 6(−20) | 300–1000 |
| Pt | $H_2$ | 1.2(−7) | 8500 | 6(−20) | 540–900 |
| Stainless, 309S | $D_2$ | 1.5(−7) | 8500 | 7(−20) | 520–720 |
| Mo | $H_2$ | 2.3(−7) | 9710 | 2(−21) | 500–1700 |
| Pyrex glass | $H_2$ | 3.6(−17) · T | 4590 | 2(−21) | 300–720 |
| 95 Cu-5 Sn | $H_2$ | 6.6(−7) | 9810 | 4(−21) | 560–640 |
| 91 Cu-7 Al-2 Fe | $H_2$ | 4.0(−8) | 8850 | 6(−21) | 620–840 |
| 50 Cu-50 Au | $H_2$ | 6.5(−6) | 11500 | 1(−22) | 370–570 |
| M = 15 glass | $H_2$ | 6.1(−7) · T | 6080 | 3(−23) | 550–720 |
| Stainless, oxide | $D_2$ | 2.8(−5) | 13900 | 2(−25) | 370–700 |
| Be | $T_2$ | 5.8(−14) | 2200(?) | 4(−17) | 670–1170 |
| Al | $T_2$ | 5.8(−5) | 14800 | 2(−26) | 420–520 |
| M = 30 glass | $H_2$ | 2.5(−16) · T | 8550 | 3(−26) | 550–720 |
| Au | $D_2$ | 3.1(−6) | 14800 | 1(−27) | 500–900 |
| W | $H_2$ | 7.8(−7) | 17000 | 2(−31) | 1100–2400 |
| Ge | $H_2$ | 1.2(−5) | 24000 | 2(−40) | 1040–1200 |
| Si | $H_2$ | 1.4(−5) | 27000 | 1(−44) | 1240–1485 |
| β-SiC | $T_2$ | 1.8(−10) | 55600 | 6(−91) | 700–1570 |

The invention claimed is:

1. A method for forming a bladder for containing material, comprising:
    forming a substantially laminated cylindrical body section;
    forming a pair of end sections having a peripheral area for extending into an end of the body section;
    providing at least one of the end sections with a boss having an opening therein; and
    securing the peripheral area of the end sections to the body section.

2. The method of claim 1, additionally including forming the pair of end sections to have a torispherical configuration.

3. The method of claim 2, additionally including forming the laminated cylindrical body section from a polymeric or fluoropolymeric layer, forming at least one metal layer on the polymeric or fluoropolymeric layer, and forming at least one polymeric or fluoropolymeric film on the metal layer.

4. The method of claim 1, wherein securing of the end sections to the body section is carried out by forming seams there between and heat sealing the seams.

5. The method of claim 1, wherein the forming of the laminated cylindrical body section is carried out by laminating a layer of polymeric or fluoropolymeric material with at least one layer of metal and at least one polymeric or fluoropolymeric film, forming the laminated polymeric or fluoropolymeric material into a cylindrical configuration, forming along the length of the laminated polymeric or fluoropolymeric material and heat sealing the seam.

6. The method of claim 2, additionally including forming a soluble mandrel having a cylindrical center portion and a pair of curved end portions connected to the center portion by a step, positioning the mandrel within the laminated cylindrical body section, positioning the curved end sections on the curved end portion or the mandrel, securing the curved end sections to the cylindrical body section, and dissolving the mandrel.

7. The method of claim 1, additionally including forming at least the laminated cylindrical body section from laminated interwoven material.

8. The method of claim 1, additionally including encasing the thus formed bladder in a graphite epoxy composite material.

9. The method of claim 8, additionally including preforming the cylindrical body section prior to encasing the bladder.

10. The method of claim 9, wherein preforming is carried by inflation by directing a gas into the cylindrical body.

11. The method of claim 9, wherein preforming is carried out by providing an inflatable member within the cylindrical body section and inflating the inflatable member.

12. The method of claim 11, wherein the inflatable member is selected from the group of mechanical and pneumatic inflatable members.

13. The method of claim 9, wherein preforming is carried out by:
    positioning an expandable structure within the bladder,
    expanding the expandable structure to a position adjacent an internal surface of the bladder,
    retracting the expandable structure following at least encasing of the bladder and removing the expandable structure from within the bladder.

14. A method for forming a bladder for fluid storage vessels, comprising:
    forming a body section of substantially impermeable material and of a configuration selected from the group consisting of cylindrical and conical;
    forming end sections of impermeable material for the body section; and
    providing means for directing fluid into and out of the body section and at least one of the end sections.

15. The method of claim 14, wherein the substantially impermeable material is composed of material substantially impermeable to any of $H_2$, $D_2$ and $T_2$.

16. The method of claim 14, wherein the low permeability material is composed of a metal.

17. The method of claim 14, wherein forming the body section and end sections is carried out using a material selected from the group consisting of a laminated material, and a material including a layer of interwoven material and at least one polymeric film.

18. The method of claim 14, wherein the forming of the body and end sections is carried out using a material including a layer of polymeric or fluoropolymeric material, at least one layer of material substantially impermeable to any of $H_2$, $D_2$ and $T_2$, and at least one polymeric or fluoropolymeric film.

19. The method of claim 18, wherein the layer of polymeric material is selected from the group consisting of PET and THV, wherein the layer of substantially impermeable material is selected from the group consisting of silver, gold, and aluminum, and wherein the polymeric film is selected from the group consisting of low density polyethylene, low density polyethylene copolymer, and THV.

20. The method of claim 19, additionally including forming the copolymer so as to be composed of about 95% by weight low density polyethylene and about 5% by weight ethylene vinyl acetate.

21. The method of claim 19, the material is THV and is formed so as to be composed of about 60% by weight trifluoroethylene, about 20% by weight hexafluoropropylene, and about 20% by weight vinylidene difluoride.

22. The method of claim 18, wherein forming the body and end sections is carried out using a 0.2–10 mil thick layer of polymeric material, a 10–1000 nm thick layer of substantially impermeable material, and a 0.2–10 mil thick polymeric film.

23. The method of claim 14, wherein the end sections are formed of a torispherical or near torispherical configuration.

24. The method of claim 14, additionally including forming the low permeability material as a laminate consisting of a layer of polymeric material, a layer of metal on opposite sides of said polymeric material, and a polymeric film on each layer of metal.

25. The method of claim 14, additionally including forming the low permeability material as a laminate consisting of interwoven threads, and a polymeric film on each side of the interwoven threads.

26. The method of claim 14, wherein the means is formed to define a boss mounted in at least one of the end sections.

* * * * *